(12) United States Patent
Lim et al.

(10) Patent No.: US 11,735,793 B2
(45) Date of Patent: Aug. 22, 2023

(54) METHOD FOR MANUFACTURING BATTERY PACK

(71) Applicants: HYUNDAI MOTOR COMPANY, Seoul (KR); KIA CORPORATION, Seoul (KR)

(72) Inventors: Hae Kyu Lim, Bucheon-si (KR); Jeong Hun Seo, Suwon-si (KR); Yun Ho Kim, Suwon-si (KR); Ji Woong Jung, Anyang-si (KR); Tae Hyuck Kim, Asan-si (KR); Gyung Hoon Shin, Seoul (KR); Jong Wook Lee, Hwaseong-si (KR); In Gook Son, Hwaseong-si (KR); Wu Hyun Kim, Goyang-si (KR); Jae Hyeon Ju, Seoul (KR); Kang Won Lee, Seongnam-si (KR); Yong Hwan Choi, Seoul (KR); Yu Ri Oh, Hwaseong-si (KR); Hwi Moon, Ulsan (KR); Young O Lee, Ulsan (KR); Jae Won Lee, Seoul (KR); Jae Ho Bae, Ulsan (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 175 days.

(21) Appl. No.: 17/399,321

(22) Filed: Aug. 11, 2021

(65) Prior Publication Data

US 2022/0190428 A1 Jun. 16, 2022

(30) Foreign Application Priority Data

Dec. 10, 2020 (KR) .................. 10-2020-0172633

(51) Int. Cl.
*H01M 50/26* (2021.01)
*H01M 50/209* (2021.01)
(Continued)

(52) U.S. Cl.
CPC .......... *H01M 50/26* (2021.01); *H01M 50/20* (2021.01); *H01M 50/204* (2021.01);
(Continued)

(58) Field of Classification Search
CPC ............... H01M 50/26; H01M 50/209; H01M 50/3425; H01M 50/207; H01M 50/267;
(Continued)

(56) References Cited

FOREIGN PATENT DOCUMENTS

EP           3352290 A1 * 7/2018   ....... C08G 65/33317
KR   10-2012-0062260 A   6/2012
(Continued)

*Primary Examiner* — Christopher P Domone
*Assistant Examiner* — Jonathan William Estes
(74) *Attorney, Agent, or Firm* — Lempia Summerfield Katz LLC

(57) ABSTRACT

Disclosed is a method for manufacturing a battery pack which has an upper plate configured to have a seating surface, on which battery modules are seated, and a plurality of members configured to separate the seating surface of the upper plate into a plurality of regions. The method includes calculating height tolerances of the seating surface in the respective regions, determining application amounts of the gap filler in the respective regions based on the calculated height tolerances in the respective regions, and applying the determined application amounts of the gap filler in the respective regions.

8 Claims, 5 Drawing Sheets

(51) Int. Cl.
  *H01M 50/267* (2021.01)
  *H01M 50/289* (2021.01)
  *H01M 50/233* (2021.01)
  *H01M 50/204* (2021.01)
  *H01M 50/20* (2021.01)
  *H01M 50/207* (2021.01)
(52) U.S. Cl.
  CPC ....... *H01M 50/207* (2021.01); *H01M 50/209* (2021.01); *H01M 50/233* (2021.01); *H01M 50/267* (2021.01); *H01M 50/289* (2021.01)
(58) Field of Classification Search
  CPC .. H01M 50/289; H01M 50/20; H01M 50/204; H01M 50/233
  See application file for complete search history.

(56) References Cited

FOREIGN PATENT DOCUMENTS

| | | | |
|---|---|---|---|
| KR | 10-2019-0124368 A | 11/2019 | |
| WO | WO-2018166762 A1 * | 9/2018 | .............. B60L 50/64 |

\* cited by examiner

METHOD FOR MANUFACTURING BATTERY PACK

CROSS-REFERENCE TO RELATED APPLICATION

This application claims priority to and the benefit of Korean Patent Application No. 10-2020-0172633, filed on Dec. 10, 2020, the entire contents of which are incorporated herein by reference.

FIELD

The present disclosure relates to a battery pack, and more particularly to a method for manufacturing a battery pack.

BACKGROUND

The statements in this section merely provide background information related to the present disclosure and may not constitute prior art.

Recently, in keeping with the global trend toward reduction in carbon dioxide emissions, instead of typical internal combustion engine vehicles which generate power through combustion of fossil fuels, the demand for electric vehicles which generate power by driving motors using electrical energy stored in batteries is greatly increased.

The performance of an electrical vehicle depends heavily on the capacity and the performance of a battery which stores electrical energy supplied to a driving motor. Further, in order to install the battery having a large capacity in the confined space of the vehicle, various battery layouts have been developed, and research on weight reduction and miniaturization of batteries has been vigorously conducted.

Recently, batteries for electric vehicles are being developed in a manner in which one battery pack is manufactured by packaging a plurality of modules, each of which includes a designated number of battery cells, into a case. In such a battery pack structure, the battery modules are seated on a battery case by interposing a gap filler formed of a thermal interface material (TIM) between the battery modules and the battery case in order to effectively transmit heat generated by the battery modules to the battery case.

However, we have discovered that the gap filler is not properly applied to some sections. For example, the gap filler is not applied on a section between the battery modules and the seating surface of the battery case on which the battery modules are seated, and an excessively large amount of the gap filler is applied to a section where height deviations of the seating surfaces of the case occur. Therefore, heat dissipation from the battery modules may be reduced, resulting in deterioration in durability of the battery and burning of the battery.

The above information disclosed in the Background section is only for enhancement of understanding of the background of the present disclosure and should not be interpreted as conventional technology that is already known to those skilled in the art.

SUMMARY

The present disclosure provides a method for manufacturing a battery pack which may optimize the amount of a gap filler applied to a section between battery modules and a lower case on which the battery modules are seated.

In one form of the present disclosure, a method for manufacturing a battery pack, wherein the battery pack has an upper plate configured to have a seating surface, on which battery modules are seated, and a plurality of members configured to separate the seating surface of the upper plate into a plurality of regions, the method including calculating height tolerances of the seating surface in the respective regions, determining application amounts of the gap filler in the respective regions based on the calculated height tolerances in the respective regions, and applying the determined application amounts of the gap filler in the respective regions.

In one form, the height tolerances are calculated based on heights of upper ends of the respective members and vertical distances from the heights of the upper ends to the seating surface, and the vertical distance in each region of the plurality of regions is measured at a plurality of points.

In another form, the upper end of one member among the plurality of members is used as a reference to measure the vertical distances in a corresponding region among the plurality of regions, and a battery module among the battery modules is fixed to the one member.

The application amounts of the gap filler in the respective regions based on the calculated height tolerances in the respective regions may be determined in advance.

Each of the application amounts of the gap filler in the respective regions based on the calculated height tolerances in the respective regions may be determined by adding an additional application amount corresponding to a tolerance of the seating surface having a height lower than a reference height to a predetermined reference application amount.

The additional application amount may be determined so as to increase a height of the gap filler in increments of 0.5 mm, and a maximum value of the additional application amount of the gap filler may be an amount of the gap filler applied so as to increase the height of the gap filler by 1.5 mm.

The application amounts of the gap filler in the respective regions may be determined based on the height tolerances of the seating surface in the respective regions and at least one of a clearance between a stack of battery cells and the seating surface, manufacturing variation of the battery cells configured to form the battery modules, variation due to alignment of the battery cells when stacking the battery cells, or assembly variation occurring when the battery modules are fixed to the members.

The method may further include, after the applying the gap filler to the seating surface in the respective regions, calculating height tolerances of an upper surface of the gap filler applied in the respective regions and storing the calculated height tolerances.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
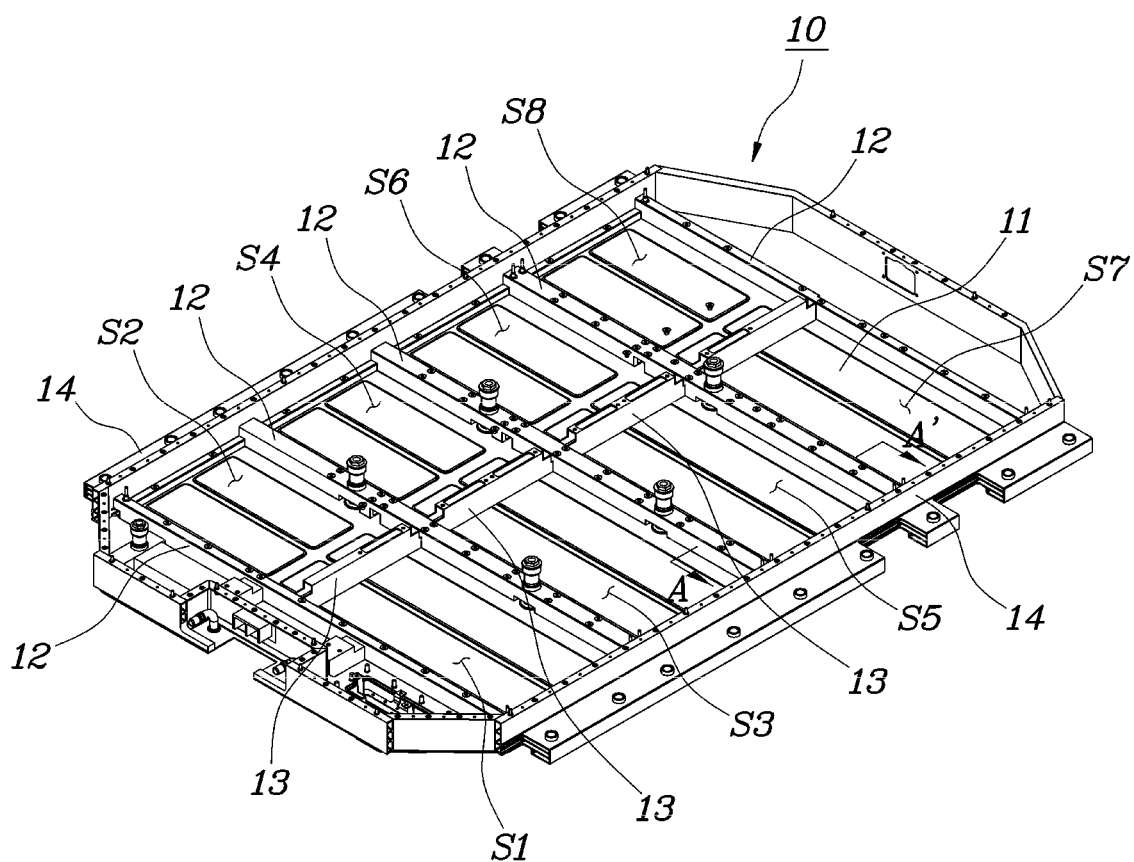
FIG. 1 is a perspective view illustrating a lower case of a battery pack to which a method for manufacturing a battery pack according to one form of the present disclosure is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the exemplary forms of the present disclosure, which are illustrated in the accompanying drawings. Wherever possible, the same reference numbers will be used throughout the drawings to refer to the same or like parts.

Hereinafter, a method for manufacturing a battery pack according to one exemplary form of the present disclosure will be described with reference to the accompanying drawings.

Figure 2:
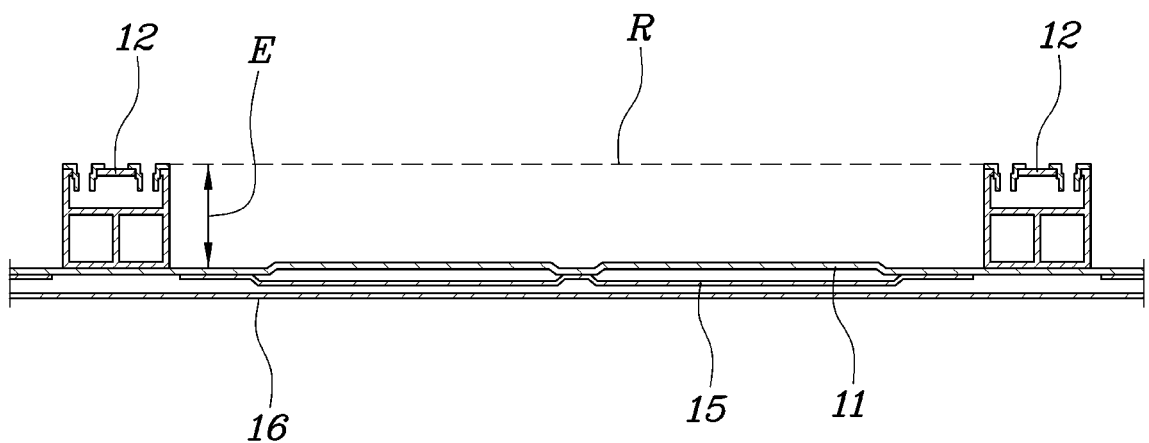
FIG. 2 is a cross-sectional view of FIG. 1, taken along line A-A'.

FIG. 1 is a perspective view illustrating a lower case of a battery pack to which a method for manufacturing a battery pack according to one form of the present disclosure is applied, and FIG. 2 is a cross-sectional view of FIG. 1, taken along line A-A'.

Referring to FIGS. 1 and 2, a lower case 10 of a battery pack according to one form of the present disclosure includes an upper plate 11 configured to form a seating surface on which battery modules are seated, a plurality of members 12 and 13 configured to separate the seating surface of the upper plate 11 into a plurality of regions S1 to S8, and a side wall 14 disposed at the edge of the upper plate 11.

The upper plate 11 is a member configured to form the bottom surface of the lower case 10, and the upper surface of the upper plate 11 may provide the seating surface on which the battery modules are seated. The side wall 14 configured to form a space on the upper surface of the upper plate 11 may be bonded to the edge of the upper plate 11. Further, the members 12 and 13 may be installed on the upper surface of the upper plate 11.

The members 12 and 13 may include a plurality of cross members 12 disposed in the lateral direction of the lower case 10, and a longitudinal member 13 disposed in the longitudinal direction perpendicular to the lateral direction. The cross members 12 and the longitudinal member 13 may serve to provide stiffness in the cross direction and the lateral direction of the lower case 10 and to separate the upper plate 11 of the lower case 10 into a plurality of regions S1 to S8.

A cooling channel 15 configured to form a path, along which cooling water flows, may be bonded to the lower surface of the upper plate 11, and a lower cover 16 may be disposed below the upper plate 11 to cover the lower surface of the upper plate 11 and the cooling channel 15 so as to protect the upper plate 11 and the cooling channel 15.

Respective elements forming the lower case 10 may be formed of an aluminum material so as to realize weight reduction.

Figure 3:
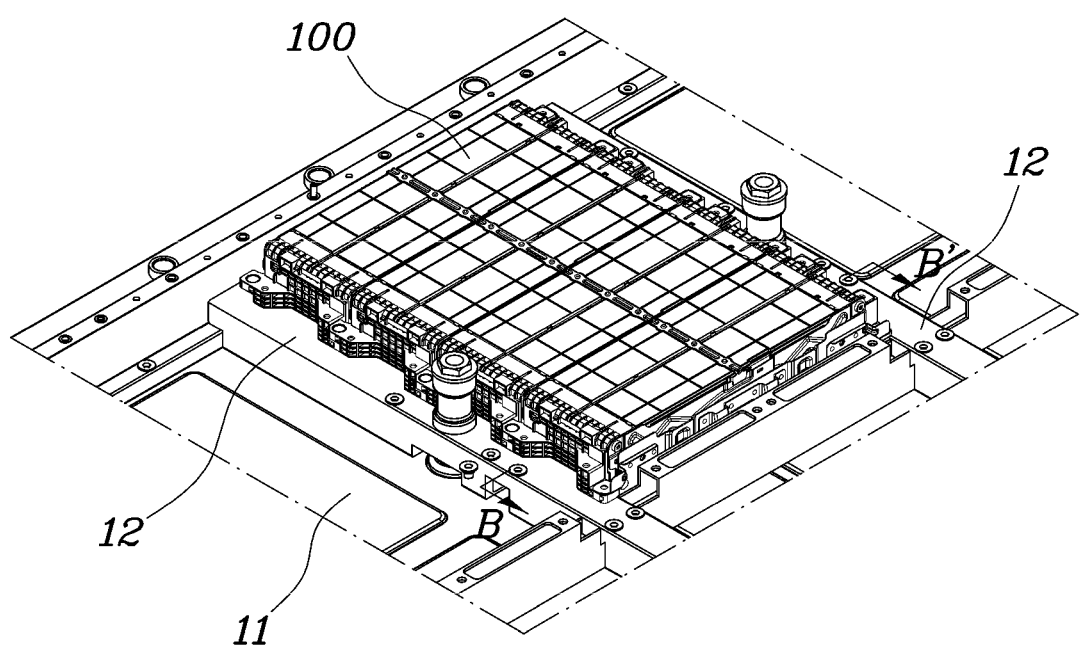
FIG. 3 is a perspective view illustrating the state in which battery modules are disposed in a separation region shown in FIG. 1.
Figure 4:
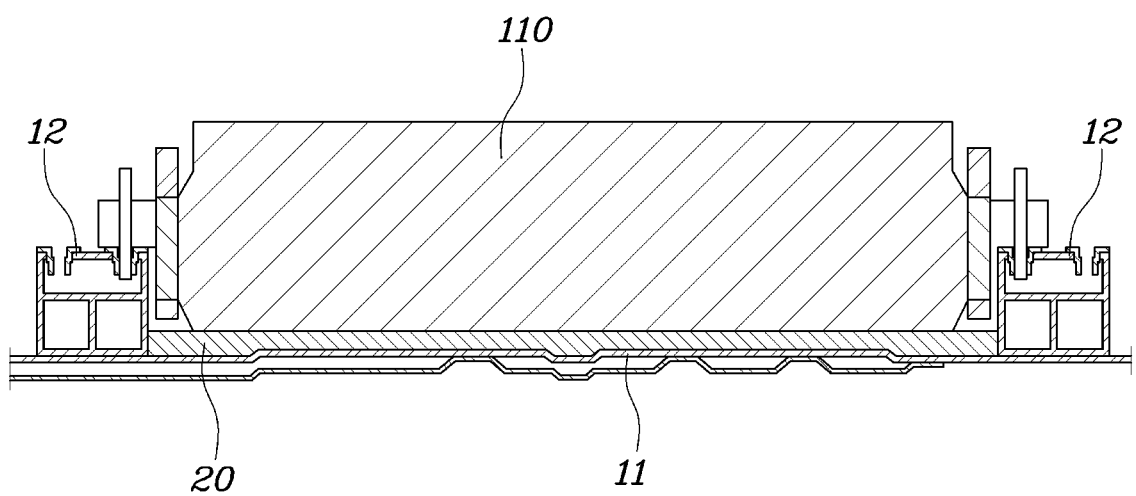
FIG. 4 is a cross-sectional view of FIG. 3, taken along line B-B'.

FIG. 3 is a perspective view illustrating the state in which the battery modules are disposed in the separation region shown in FIG. 1, and FIG. 4 is a cross-sectional view of FIG. 3, taken along line B-B'.

Referring to FIGS. 3 and 4, battery modules 100 may be disposed in a designated disposition structure in each of the respective regions S1 to S8 formed on the upper plate 11 of the lower case 10. FIG. 3 illustrates an example in which four battery modules 100 are disposed in one region.

The battery module 100 is one unit structure consisting of the battery back, and may include a plurality of battery cells 100. The battery cell 110 is an element configured to output the smallest unit of voltage, a plurality of battery cells 110 is stacked, and the battery module 100 is formed by compressing the external surface of the stack of the battery cells 110 using a hard structure and then forming terminals for conductively connecting the battery cells 110 thereon. The battery modules 100 may be manufactured to have different detailed shapes or structures depending on manufacturers or vehicles. The battery pack 10 may include a plurality of these battery modules 100, and have a structure which is finally manufactured so as to output a designated level of voltage by conductively connecting the battery modules 100.

Both ends of the battery modules 100 may be fixed to the cross members 12, and the lower surfaces of the battery modules 100 may come into surface contact with the upper surface, i.e., the seating surface, of the upper plate 11 of the lower case 10. A gap filler 20 formed of a thermal interface material (TIM) may be applied to the seating surface prior to seating the battery modules 100 on the seating surface, so as to increase a direct or indirect contact area between the lower surfaces of the battery modules 100 and the seating surface, thereby being capable of enabling heat emitted by the battery cells 110 to be discharged to the cooling channel 15 through the seating surface.

The present disclosure relates to a method for applying the gap filler between the battery modules 100 and the seating surface of the lower case 10 of the battery pack, on which the battery modules 100 are seated.

Figure 5:
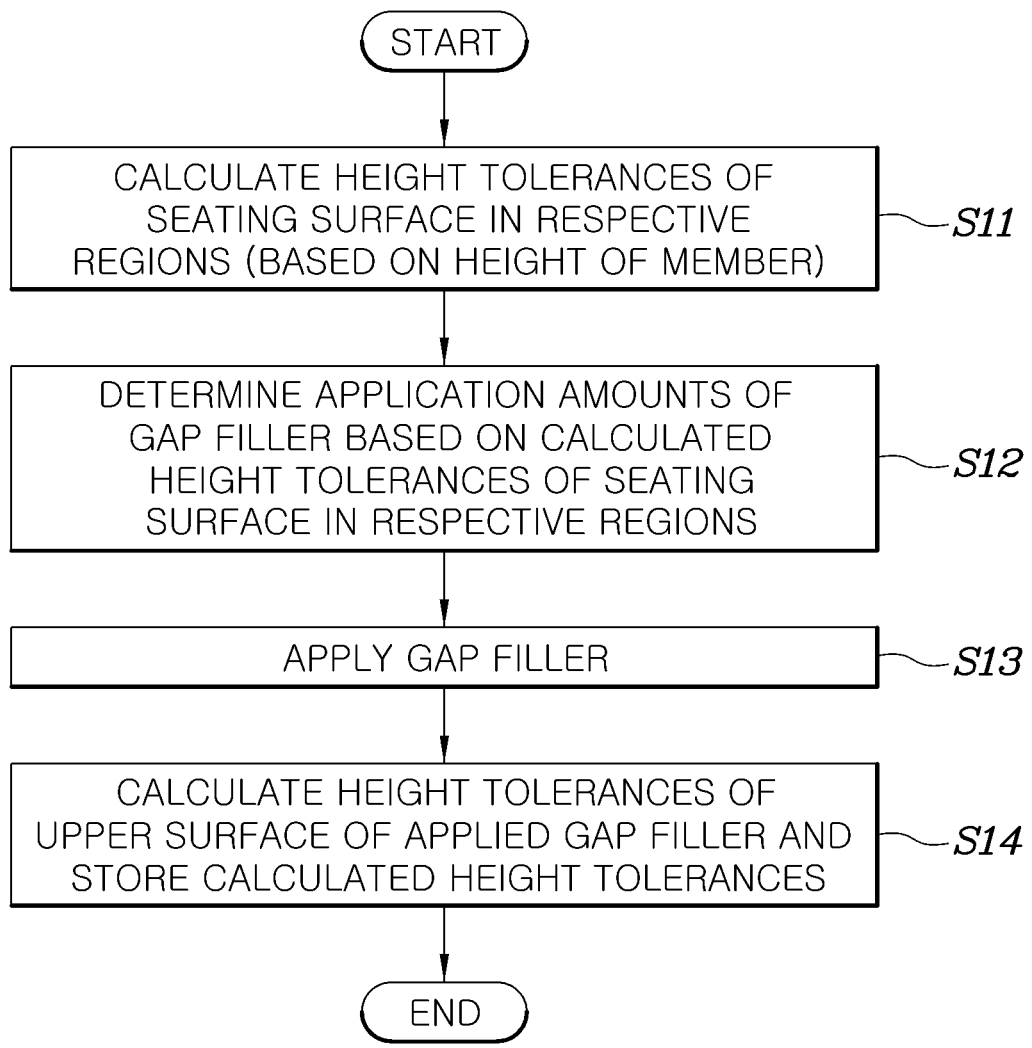
FIG. 5 is a flowchart illustrating a method for applying a gap filler according to one form of the present disclosure.

FIG. 5 is a flowchart illustrating a method for applying the gap filler according to one form of the present disclosure.

Referring to FIG. 5, the method for applying the gap filler according to one form of the present disclosure may include calculating height tolerances of the seating surface of the lower case 100 of the battery pack, on which the battery modules 100 are seated, in the respective regions formed on the seating surface (S11), determining the application amounts of the gap filler in the respective regions based on the height tolerances in the respective regions (S12), and applying the gap filler to the seating surface in the determined application amounts of the gap filler in the respective regions (S13).

In addition, the method for applying the gap filler according to one form of the present disclosure may further include, after applying the gap filler to the seating surface in the respective regions (S13), calculating height tolerances of the upper surface of the gap filler in the respective regions in the state in which the gap filler is applied to the seating surface in the respective regions, and storing the calculated height tolerances (S14).

In operation S11, the height tolerances of the seating surface (i.e., the upper surface of the upper plate 11) of the lower case 100 of the battery pack, on which the battery modules 100 are seated, in the respective regions formed by the cross members 12 and the longitudinal member 13 are calculated.

The height tolerances may be derived by calculating vertical distances from the height R of the upper end of the cross member 12 or the longitudinal member 13 forming each of the respective regions to the seating surface in a corresponding one of the respective regions, and then calculating tolerances of the vertical distances. Here, the vertical height may be acquired using a three-dimensional displacement sensor. The displacement sensor may measure a distance E from the height R of the upper end of the cross member 12 or the longitudinal member at each of a plurality of points, which are spaced apart from one another by a designated interval on the seating surface in each separation region, and calculate tolerances of the measured distances E, i.e., heights, at the respective points.

Various forms of the present disclosure provide a method for applying an optimal amount of the gap filler between the lower surfaces of the battery modules 100 and the seating surface, and in Operation S11, more particularly, distances based on the height of the upper end of a member, to which the battery modules 100 are fixed (the cross member 12 in the example shown in FIGS. 1 to 4), may be measured and tolerances of the distances may be derived.

Thereafter, in Operation S12, the application amounts of the gap filler in the respective separation regions may be determined based on the tolerances measured in Operation S11. The application amounts of the gap filler based on the height tolerances of the seating surface in the respective separation regions may be determined in advance through experimentation.

For example, the application amounts of the gap filler may be expressed as the heights of the gap filler applied to the respective separation regions, and if the tolerance measured in Operation S11 is a value indicating the state in which the seating surface sinks, the application amount of the gap filler in the corresponding separation region may be determined so as to increase the height of the gap filler applied to the corresponding separation region.

Table 1 below exemplarily shows the relationships between tolerances and application amounts of the gap filler, and particularly shows an example of determination of the application amounts of the gap filler based on tolerances measured in eight separation regions, as shown in FIG. 1.

termined reference application amount may be determined based on the size of the tolerance.

The additional application amount may be determined so as to increase the height of the applied gap filler in increments of 0.5 mm, and more particularly, the maximum value of the additional application amount of the gap filler may be an amount of the gap filler applied so as to increase the height of the applied gap filler by 1.5 mm compared to the height of the applied gap filler when the reference amount of the gap filler is applied. If the application amount of the gap filler is increased so that the height of the applied gap filler is greater than the height of the applied gap filler when the reference amount of the gap filler is applied by more than 1.5 mm, a defect in manufacture of the seating surface occurs and thus excessively great height tolerances of the seating surface may be formed.

Further, the application amounts of the gap filler in the respective separation regions may be determined in consideration of other factors, which are to be taken into account in the adjustment of the application amounts of the gap filler, in addition to the measured tolerances. For example, as shown in FIG. 4, in case of the battery module 100 in which the stack of the battery cells 110 is exposed downwards, a clearance between the stack of the battery cells 110 and the seating surface of the lower case 10, manufacturing variation of the battery cells 110, variation due to misalignment of the battery cells 100 when stacking the battery cells 100, assembly variation occurring when the battery modules 100 are fixed to the corresponding members 12, etc. may be considered so as to determine the application amounts of the gap filler in addition to the height tolerances of the seating surface of the lower case 10.

In Operation S12, the application amounts of the gap filler may be determined by a computer or a controller provided with an algorithm or a program executed to calculate the application amounts of the gap filler based on the above-described factors to determine the application amounts of the gap filler in advance.

Thereafter, in Operation S13, the gap filler may be applied to the seating surface in the determined application amounts thereof in the respective separation regions. Operation S13 may be implemented using gap filler application equipment.

TABLE 1

| First separation region (S1) | | Second separation region (S2) | | Third separation region (S3) | | Fourth separation region (S4) | |
|---|---|---|---|---|---|---|---|
| 0.52 | 0.47 | 0.56 | 0.54 | 0.37 | 0.56 | 0.31 | 0.51 |
| 0.84 | 0.79 | 0.19 | 0.54 | 0.37 | 0.15 | 0.29 | 0.1 |
| 0.03 | 0.27 | −0.25 | 0.05 | −0.12 | −0.38 | 0.26 | 0.13 |
| No addition | | Addition of 0.5 mm | | Addition of 0.5 mm | | No addition | |

| Fifth separation region (S5) | | Sixth separation region (S6) | | Seventh separation region (S7) | | Eighth separation region (S8) | |
|---|---|---|---|---|---|---|---|
| −0.84 | −0.12 | −0.17 | 0.29 | −0.02 | −0.61 | 0.07 | −0.41 |
| 0.04 | 0.21 | 0.14 | 0.06 | 0.43 | 0.04 | −0.18 | −0.23 |
| 0.24 | 0.21 | 0.8 | 014 | 0.53 | 0.72 | 0.25 | 0.72 |
| Addition of 1 mm | | Addition of 0.5 mm | | Addition of 1 mm | | Addition of 0.5 mm | |

As set forth in Table 1 above, in Operation 12, in which the application amounts of the gap filler in the respective separation regions are determined based on the tolerances measured in Operation 11, when a tolerance acquired at each point in the separation regions has a negative value, i.e., when the height at each point is lower than a reference height, an additional application amount added to a prede- Thereafter, in Operation S14, tolerances of the distances from the height of the upper end of the member 12 applied in Operation S11 to the seating surface may be measured in the state in which the gap filler is applied to the seating surface, and then the measurement results may be stored. In Operation S14, the distances from the height of the upper end of the member 12 to the upper surface of the applied gap filler in the respective regions is measured, tolerances are calculated using the measured distances, and then the calculated tolerances are stored. By storing the tolerances up to the surface of the applied gap filler, the process for applying the gap filler may be further improved due to re-setting of the application amounts of the gap filler so as to adjust distance tolerances after applying the gap filler.

In Operation S14, the height tolerances of the upper surface of the applied gap filler may be measured using the three-dimensional displacement sensor applied to Operation S11, and may then be stored in a storage unit within a computer.

Thereafter, although not shown in the drawings, a process for seating the battery modules 100 on the seating surface, to which the gap filler is applied, may be performed so as to manufacture the battery pack.

As described above, according to various forms of the present disclosure, height tolerances of the seating surface of the lower case of the battery pack, on which the battery modules are seated, in the respective regions may be calculated, and the application amounts of the gap filler in the respective regions may be determined based on the calculated height tolerances. With this method, the application amounts of the gap filler are determined in consideration of the height tolerances of the bottom surface in the respective regions, and thus, the application amounts of the gap filler in the respective regions may be determined so as only to offset the height tolerances in the corresponding regions. Therefore, compared to a method in which a height tolerance of the overall seating surface is calculated and the application amount of the gap filler is determined based on the calculated height tolerance, the method for applying the gap filler according to another form of the present disclosure may comparatively reduce the total amount of the gap filler that is applied by calculating the amounts of the gap filler to be applied to the respective regions based on the tolerances in the respective regions, thereby being capable of reducing the cost incurred in the manufacture of the battery pack.

As is apparent from the above description, a method for manufacturing a battery back according to one form of the present disclosure may, by calculating the amounts of a gap filler to be applied to the seating surface of an upper plate of a lower case in respective regions based on tolerances in the respective regions, reduce the total amount of the gap filler to be applied to the entire seating surface compared to a method in which a height tolerance of the overall seating surface is calculated and the application amount of the gap filler is determined based on the calculated height tolerance, thereby being capable of reducing the cost incurred in the manufacture of the battery pack.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A method for manufacturing a battery pack, wherein the battery pack has an upper plate configured to have a seating surface, on which battery modules are seated, and a plurality of members configured to separate the seating surface into a plurality of regions, the method comprising:
    calculating height tolerances of the seating surface in respective regions of the plurality of regions;
    determining application amounts of a gap filler in the respective regions based on the calculated height tolerances; and
    applying the determined application amounts of the gap filler in the respective regions.

2. The method according to claim 1, wherein the height tolerances are calculated based on heights of upper ends of the respective members and vertical distances from the heights of the upper ends to the seating surface, and
    wherein the vertical distance in each region of the plurality of regions is measured at a plurality of points.

3. The method according to claim 2, wherein the upper end of one member among the plurality of members is used as a reference to measure the vertical distances in a corresponding region among the plurality of regions, and a battery module among the battery modules is fixed to the one member.

4. The method according to claim 1, wherein the application amounts of the gap filler in the respective regions based on the calculated height tolerances in the respective regions are determined in advance.

5. The method according to claim 4, wherein each of the application amounts of the gap filler in the respective regions based on the calculated height tolerances in the respective regions is determined by adding an additional application amount corresponding to a tolerance of the seating surface having a height lower than a reference height to a predetermined reference application amount.

6. The method according to claim 5, wherein the additional application amount is determined so as to increase a height of the gap filler in increments of 0.5 mm, and a maximum value of the additional application amount of the gap filler is an amount of the gap filler applied so as to increase the height of the gap filler by 1.5 mm.

7. The method according to claim 1, wherein the application amounts of the gap filler in the respective regions are determined based on the height tolerances of the seating surface in the respective regions and at least one of a clearance between a stack of battery cells and the seating surface, manufacturing variation of the battery cells configured to form the battery modules, variation due to alignment of the battery cells when stacking the battery cells, or assembly variation occurring when the battery modules are fixed to the plurality of members.

8. The method according to claim 1, further comprising, after the applying the gap filler to the seating surface in the respective regions, calculating height tolerances of an upper surface of the gap filler applied in the respective regions and storing the calculated height tolerances.

* * * * *